United States Patent
Lacy et al.

(10) Patent No.: US 9,931,695 B2
(45) Date of Patent: Apr. 3, 2018

(54) ARTICLE AND METHOD FOR MAKING AN ARTICLE

(71) Applicant: GENERAL ELECTRIC COMPANY, Schenectady, NY (US)

(72) Inventors: Benjamin Paul Lacy, Greenville, SC (US); David Edward Schick, Greenville, SC (US); Srikanth Chandrudu Kottilingam, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 606 days.

(21) Appl. No.: 14/496,766

(22) Filed: Sep. 25, 2014

(65) Prior Publication Data

US 2016/0089719 A1 Mar. 31, 2016

(51) Int. Cl.
| | |
|---|---|
| *B22F 3/105* | (2006.01) |
| *C22C 19/05* | (2006.01) |
| *B32B 15/01* | (2006.01) |
| *C22C 19/07* | (2006.01) |
| *B29C 67/00* | (2017.01) |
| *B22F 5/00* | (2006.01) |
| *B22F 7/08* | (2006.01) |
| *C23C 24/10* | (2006.01) |
| *C23C 28/02* | (2006.01) |

(Continued)

(52) U.S. Cl.
CPC ............ *B22F 3/1055* (2013.01); *B22F 5/009* (2013.01); *B22F 7/08* (2013.01); *B23K 26/342* (2015.10); *B29C 67/0077* (2013.01); *B32B 15/01* (2013.01); *C22C 19/057* (2013.01); *C22C 19/07* (2013.01); *C23C 24/106* (2013.01); *C23C 28/02* (2013.01); *C23C 28/022* (2013.01); *C23C 28/34* (2013.01); *B23K 2201/001* (2013.01); *B33Y 10/00* (2014.12); *B33Y 80/00* (2014.12); *Y02P 10/295* (2015.11)

(58) Field of Classification Search
None
See application file for complete search history.

(56) References Cited

U.S. PATENT DOCUMENTS

| | | |
|---|---|---|
| 6,420,677 B1 | 7/2002 | Emer et al. |
| 6,744,020 B2 | 6/2004 | Shirakawa et al. |

(Continued)

*Primary Examiner* — Jessee R Roe
*Assistant Examiner* — Ngoclan T Mai
(74) *Attorney, Agent, or Firm* — McNees Wallace & Nurick LLC (57) ABSTRACT

An article and a method for making shaped cooling holes in an article are provided. The method includes the steps of depositing a metal alloy powder to form an initial layer including at least one aperture, melting the metal alloy powder with a focused energy source to transform the powder layer to a sheet of metal alloy, sequentially depositing an additional layer of the metal alloy powder to form a layer including at least one aperture corresponding to the at least one aperture in the initial layer, melting the additional layer of the metal alloy powder with the focused energy source to increase the sheet thickness, and repeating the steps of sequentially depositing and melting the additional layers of metal alloy powder until a structure including at least one aperture having a predetermined profile is obtained. The structure is attached to a substrate to make the article.

24 Claims, 5 Drawing Sheets

(51) Int. Cl.
*C23C 28/00* (2006.01)
*B23K 26/342* (2014.01)
*B33Y 10/00* (2015.01)
*B33Y 80/00* (2015.01)
*B23K 101/00* (2006.01)

(56) References Cited

U.S. PATENT DOCUMENTS

| | | |
|---|---|---|
| 7,019,257 B2 | 3/2006 | Stevens |
| 7,147,899 B2 | 12/2006 | Fernihough et al. |
| 7,820,267 B2 | 10/2010 | Fahndrich |
| 8,153,923 B2 | 4/2012 | Beck et al. |
| 8,245,519 B1 | 8/2012 | Liang |
| 2005/0241147 A1 | 11/2005 | Arnold et al. |
| 2006/0054079 A1 | 3/2006 | Withey et al. |
| 2011/0135952 A1* | 6/2011 | Morris ................ B22F 3/1055 428/548 |
| 2011/0284510 A1* | 11/2011 | Reeves-Hall ........ B23K 26/032 219/121.72 |
| 2013/0071562 A1* | 3/2013 | Szuromi ............... B22F 3/1055 427/237 |
| 2014/0169981 A1* | 6/2014 | Bales .................... B22F 5/04 416/96 R |

* cited by examiner

ARTICLE AND METHOD FOR MAKING AN ARTICLE

STATEMENT REGARDING FEDERALLY SPONSORED RESEARCH

This invention was made with government support under contract number DE-FC26-05NT42643 awarded by the Department of Energy. The government has certain rights in this invention.

FIELD OF THE INVENTION

The present invention is directed toward an article and a method for making an article. More specifically, the present invention is directed to an article including cooling holes and a method for making cooling holes in an article.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, one common method of increasing temperature capability of a turbine component includes the use of complex cooling channels. The complex cooling channels are often formed in metals and alloys used in high temperature regions of gas turbines. One current method of forming the complex cooling channels includes costly drilling, such as with a laser or waterjet. Another method of forming the cooling channels includes costly electrical discharge machining.

However, the complex cooling channels can be difficult to form using drilling or electrical discharge machining resulting in increased scrap, which aids in driving up costs. In particular, it is difficult to form shaped holes with the current methods. Furthermore, it is increasingly difficult to form small shaped holes with either drilling or electrical discharge machining.

An article and method with improvements in the process and/or the properties of the components formed would be desirable in the art.

BRIEF DESCRIPTION OF THE INVENTION

In one exemplary embodiment, a method for making shaped cooling holes in an article includes the steps of providing a metal alloy powder, depositing the metal alloy powder forming an initial layer to a preselected thickness and having a preselected shape, the preselected shape including at least one aperture, providing a focused energy source, melting the metal alloy powder with the focused energy source, transforming the powder layer to a sheet of metal alloy, sequentially depositing an additional layer of the metal alloy powder forming a layer of a second preselected thickness and second preselected shape over the sheet of metal alloy, the second preselected shape including at least one aperture corresponding to the at least one aperture in the initial layer, melting the additional layer of the metal alloy powder with the focused energy source, increasing the sheet thickness and forming at least one aperture having a predetermined profile, and repeating the steps of sequentially depositing additional layers of metal alloy powder and melting the additional layers of metal alloy powder until a structure having a predetermined thickness and shape and at least one aperture having a predetermined profile is obtained.

In another exemplary embodiment, an article includes a metallic substrate, and a structure including direct metal laser melted material of predetermined thickness attached to the metallic substrate, the structure having at least one aperture having a predetermined profile. The article further includes a passageway through the structure that includes the at least one aperture and a corresponding metering hole.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an article having cooling holes and a method of fabricating an article having cooling holes. Embodiments of the present disclosure, in comparison to articles and methods not using one or more of the features disclosed herein, increase aperture complexity, increase cooling hole complexity, increase aperture quality, increase film cooling, decrease cooling hole size, decrease cooling hole manufacturing cost, form shaped cooling holes separate from an article, provide repair cooling holes for attachment to an article, provide increased control over forming advanced features, or a combination thereof.

Figure 1:
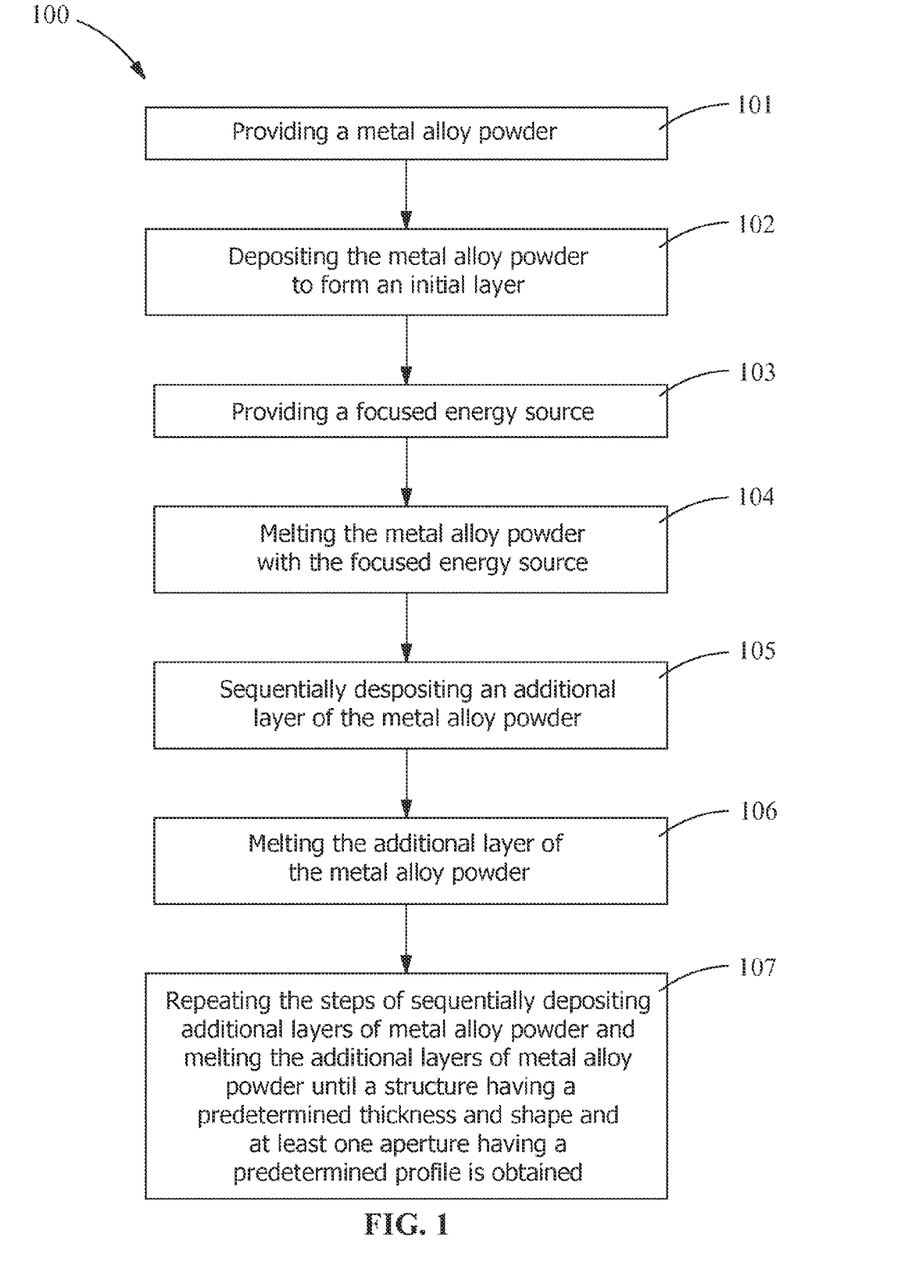
FIG. 1 is a flow chart of a method of making cooling holes.
Figure 2:
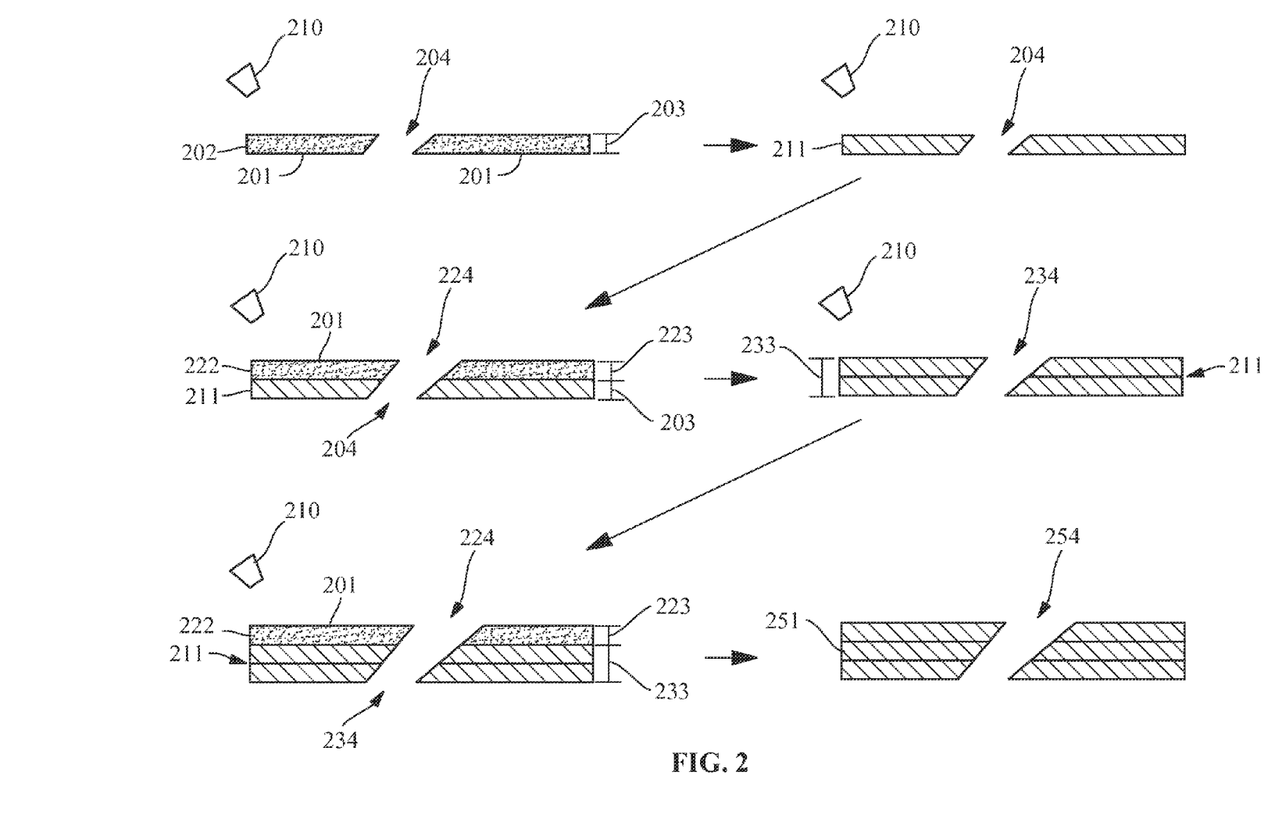
FIG. 2 is a process view of a method of making cooling holes.
Figure 3:
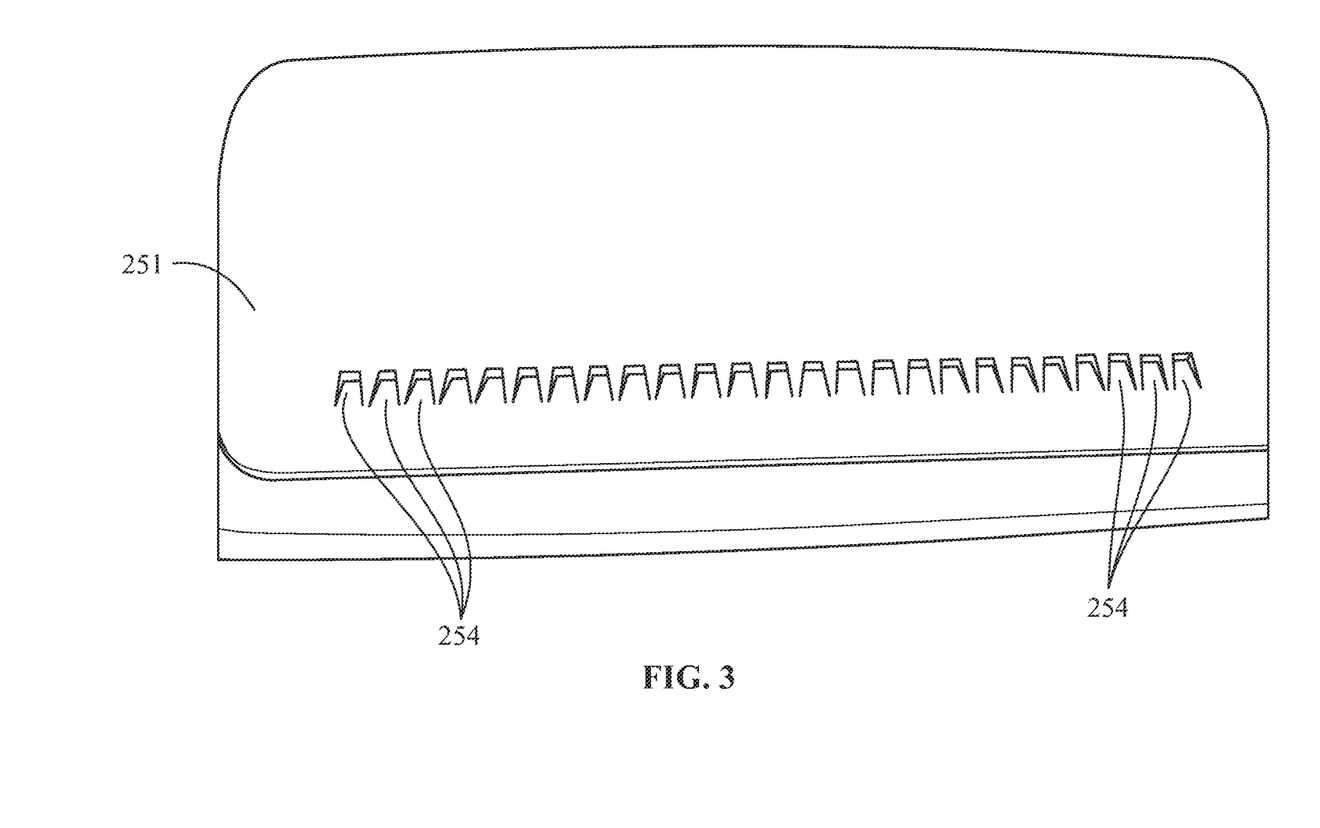
FIG. 3 is a perspective view of cooling holes formed using direct metal laser melting.

Referring to FIGS. 1-3, a method 100 of making a structure 251 with direct metal laser melting (DMLM) is provided. For example, in one embodiment, the method 100 includes making shaped cooling holes in an article. The method 100 provides any shape to the structure 251, the cooling hole in the structure 251, or any other feature in the structure 251 including an aperture, such as, but not limited to, a metered slot or an angled trench with holes. Suitable shapes include, but are not limited to, square, rectangular, triangular, circular, semi-circular, oval, trapezoidal, octagonal, shapes having features formed therein, any other geometrical shape, or a combination thereof. In another embodiment, the method 100 includes providing a metal alloy powder 201 (step 101) and depositing the metal alloy powder 201 to form an initial powder layer 202 (step 102). The initial powder layer 202 has a preselected thickness 203 and a preselected shape, which includes at least one first aperture 204. In a further embodiment, a focused energy source 210 is provided (step 103).

Suitable focused energy sources include, but are not limited to, a laser device, an electron beam device, or a combination thereof. The laser device includes any laser device operating in a power range and travel speed for melting the metal alloy powder 201, such as, but not limited to, a fiber laser, a $CO_2$ laser, or a ND-YAG laser. In one embodiment, the power range includes, but is not limited to, between 125 and 500 watts, between 150 and 500 watts, between 150 and 400 watts, or any combination, sub-combination, range, or sub-range thereof. In another embodiment, the travel speed includes, but is not limited to, between 400 and 1200 mm/sec, between 500 and 1200 mm/sec, between 500 and 1000 mm/sec, or any combination, sub-combination, range, or sub-range thereof. For example, in a further embodiment, the focused energy source 210 operates in the power range of between 125 and 500 watts, at the travel speed of between 400 and 1200 mm/sec for one to three contour passes. In another embodiment, the focused energy source 210 includes a hatch spacing of between about 0.08 mm and 0.2 mm.

The focused energy source 210 is directed at the initial powder layer 202 to melt the metal alloy powder 201 (step 104) and transform the initial powder layer 202 to a sheet of metal alloy 211. Next, the method 100 includes sequentially depositing additional metal alloy powder 201 (step 105) over the sheet of metal alloy 211 to form an additional layer 222 of a second preselected thickness 223 and a second preselected shape. The second preselected shape includes at least one second aperture 224 corresponding to the at least one first aperture 204 in the initial powder layer 202, the two apertures providing a passage for fluid communication. After depositing the additional layer 222 of the metal alloy powder 201 (step 105), the method 100 includes melting the additional layer 222 (step 106) with the focused energy source 210 to increase a sheet thickness 233 of the sheet of metal alloy 211 and form at least one combined aperture 234 having a predetermined profile.

The steps of sequentially depositing the additional layer 222 of the metal alloy powder 201 (step 105) and melting the additional layer 222 (step 106) may then be repeated (step 107) until a structure 251 having a predetermined thickness, a predetermined shape, and at least one final aperture 254 having a predetermined profile is obtained. The structure 251 includes a density of, for example, between 90% and 100%, between 95% and 99%, between 98% and 99%, between 99% and 99.8%, or any combination, sub-combination, range, or sub-range thereof. After repeating the sequentially depositing and melting steps (step 107), the structure 251 is hot isostatic pressed (HIP'd), solution heat treated, and/or stress relieved. For example, in one embodiment, the structure 251 is HIP'd for 3-5 hours at an elevated temperature of between 1149° C. and 1260° C. (2100° F. and 2300° F.), and an elevated pressure of between 68.95 MPa and 137.9 MPa (10,000 PSI and 20,000 PSI). The HIP'ing further consolidates the structure 251 to increase the density of the structure 251 from, for example, between about 98% and 100% to between about 99.5% and 99.8%. In a further embodiment, in addition to HIP'ing, the structure 251 may be solution heat treated (solutionized) for 1-2 hours in vacuum at an elevated temperature of between 1093° C. and 1205° C. (2000° F. and 2200° F.). In another embodiment, the structure 251 is heat treated for 1-3 hours in vacuum at an elevated temperature of between 1038° C. and 1149° C. (1900° F. and 2100° F.). It will be recognized by those skilled in the art that HIP'ing temperatures and heat treat temperatures will be highly dependent on the composition of the powders and the desired properties.

The preselected thickness 203 of the initial powder layer 202 and the second preselected thickness 223 of each of the additional layers 222 includes a thickness in the range of 20-100 µm (0.0008-0.004 inches), 20-80 µm (0.0008-0.0032 inches), 40-60 µm (0.0016-0.0024 inches), or any other combination, sub-combination, range, or sub-range thereof. The preselected thickness 203 is equal to or dissimilar from the second preselected thickness 223, which is varied or maintained for each of the additional layers 222. The predetermined thickness of the structure 251 is formed from the preselected thickness 203 of the initial powder layer 202 and the second preselected thickness 223 of each of the additional layers 222. Based upon the preselected thickness 203, the second preselected thickness 223, and/or how many of the additional layers 222 are deposited, the predetermined thickness of the structure 251 includes any suitable thickness in the range of 250-350000 µm (0.010-13.78 inches), 250-200000 (0.010-7.87 inches), 250-50000 µm (0.010-1.97 inches), 250-6350 µm (0.010-0.250 inches), or any combination, sub-combination, range, or sub-range thereof.

In one embodiment, the predetermined profile of the at least one aperture 254 is shaped to provide a fluid flow profile, such as for film cooling of a hot component. In one example, the predetermined profile of the at least one aperture 254 includes an arcuate-shaped profile. In another example, the predetermined profile of the at least one aperture 254 includes a conically shaped profile. Other examples include, but are not limited to, chevron-shaped profiles, circular-shaped profiles, oval-shaped profiles, polygonal-shaped profiles, or combinations thereof. In another embodiment, the predetermined profile of the at least one aperture 254 includes an opening of at least 254 µm (0.010 inches), at least 381 µm (0.015 inches), at least 508 µm (0.020 inches), or any other combination, sub-combination, range, or sub-range thereof. In a further embodiment, the predetermined profile of the at least one aperture 254 forms an angle with a surface of the structure 251. The angle includes, for example, up to 90°, between 10° and 50°, about 30°, or any combination, sub-combination, range, or sub-range thereof, with 90° being the at least one aperture 254 perpendicular to the surface of the structure 251.

Figure 4:
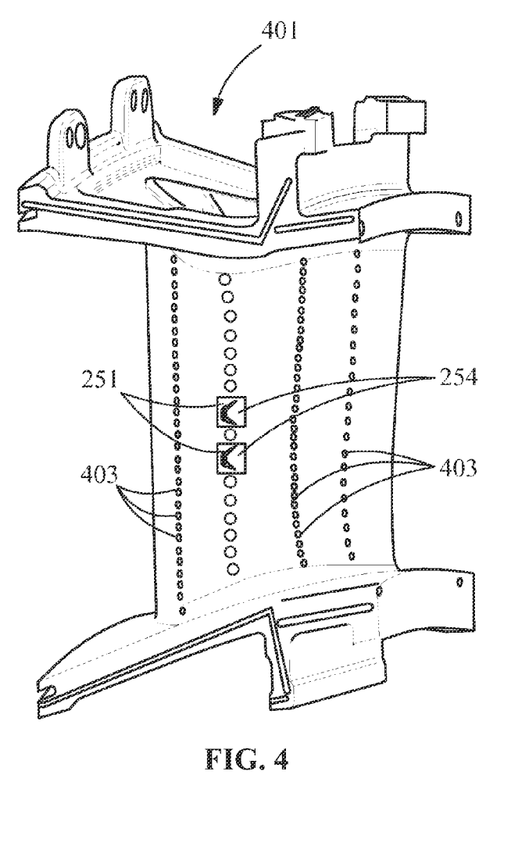
FIG. 4 is a perspective view of an article including a strip of direct metal laser melting cooling holes secured thereto.
Figure 5:
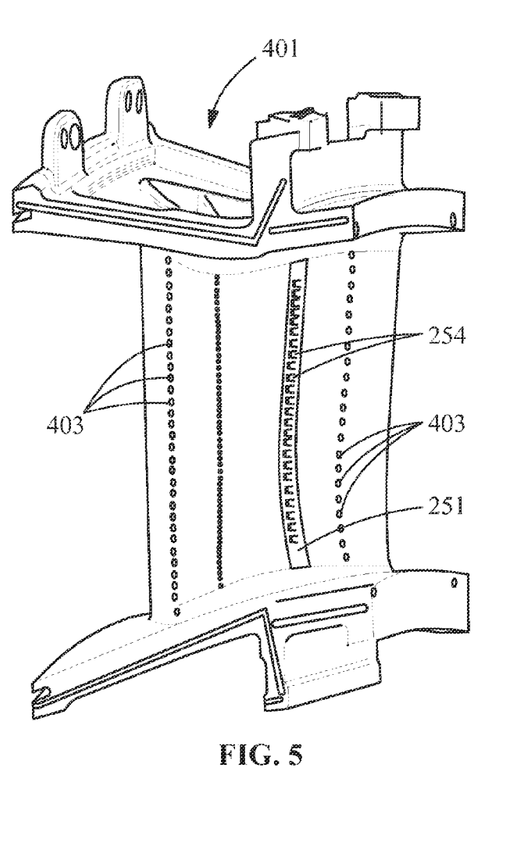
FIG. 5 is a perspective view of an article including individual direct metal laser melting cooling holes secured thereto.

Referring to FIGS. 4-5, in one embodiment, the method 100 includes providing a substrate 401, such as a metallic substrate, and attaching the structure 251 to the substrate 401. In another embodiment, the substrate 401 forms at least a portion of an article that operates at elevated temperatures. Articles that operate at elevated temperatures include, but are not limited to, gas turbine components, such as buckets, nozzles, airfoils, or any other components requiring cooling holes. In a further embodiment, the article is either a new make or an existing article, such as, but not limited to, an article for repair or upgrade.

The substrate 401 includes any suitable composition based upon the article, and the structure 251 includes any suitable composition for attachment to the substrate 401.

Suitable compositions for the substrate 401 include, but are not limited to, an alloy, such as a gamma prime superalloy or a stainless steel. In one embodiment, the gamma prime superalloy includes, for example, a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance of nickel. In another example, the gamma prime superalloy includes a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance of nickel. In another example, the gamma prime superalloy includes a composition, by weight, of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.12% Si, up to about 0.1% Mn, up to about 0.1% Cu, up to about 0.01% P, up to about 0.004% S, up to about 0.1% Nb, and a balance of nickel.

Suitable compositions for the structure 251 include, but are not limited to, an alloy, such as a stainless steel, a superalloy, or a cobalt based alloy. In one embodiment, the structure 251 is attached to a cooled region of the substrate 401, which reduces the temperatures the structure 251 is exposed to. In another embodiment, the cobalt based alloy includes, for example, 70Co-27Cr-3Mo. In a further embodiment the superalloy includes, but is not limited to, a composition, by weight, of about 0.15-0.20% carbon, about 15.70-16.30% chromium, about 8.00-9.00% cobalt, about 1.50-2.00% molybdenum, about 2.40-2.80% tungsten, about 1.50-2.00% tantalum, about 0.60-1.10% columbium, about 3.20-3.70% titanium, about 3.20-3.70% aluminum, about 0.005-0.015% boron, about 0.05-0.15% zirconium, about 0.50% maximum iron, about 0.20% maximum manganese, about 0.30% maximum silicon, about 0.015% maximum sulfur, and a balance nickel; a composition, by weight, of about 5% iron, between about 20% and about 23% chromium, up to about 0.5% silicon, between about 8% and about 10% molybdenum, between about 3.15% and 4.15% Nb+Ta, up to about 0.5% manganese, up to about 0.1% carbon, and a balance nickel; a composition, by weight, of about 50%-55% Nickel+Cobalt, about 17%-21% chromium, about 4.75%-5.50% columbium+tantalum, about 0.08% carbon, about 0.35% manganese, about 0.35% silicon, about 0.015% phosphorus, about 0.015% sulfur, about 1.0% cobalt, about 0.35%-0.80% aluminum, about 2.80%-3.30% molybdenum, about 0.65%-1.15% titanium, about 0.001%-0.006% boron, 0.15% copper, and a balance iron; and/or a composition, by weight, of about 20% chromium, about 10% cobalt, about 8.5% molybdenum, maximum of about 2.5% titanium, about 1.5% aluminum, maximum of about 1.5% iron, maximum of about 0.3% manganese, maximum of about 0.15% silicon, about 0.06% carbon, about 0.005% boron, and a balance nickel.

The structure 251 and the substrate 401 are compatible. Preferably, when the substrate 401 is a stainless steel, the structure 251 is also a stainless steel. Similarly, if the substrate 401 is a gamma prime superalloy the structure 251 is also a gamma prime superalloy.

Attaching the structure 251 to the substrate 401 includes processes such as, but not limited to, brazing, welding, diffusion bonding, or a combination thereof. In one embodiment, when attaching the structure 251 to the substrate 401 includes brazing, a braze material, such as a boron-nickel alloy and/or a silicon nickel alloy, is used. In another embodiment, when attaching the structure 251 to the substrate 401 includes welding the structure 251 to a gamma prime superalloy, a weld filler material, such as a filler material having a composition, by weight, of about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and a balance cobalt; and/or a composition, by weight, of about 22% chromium, about 16% iron, about 9% molybdenum, about 1.5% cobalt, about 0.6% tungsten, about 0.10% carbon, about 1% manganese, about 1% silicon, about 0.008% boron and a balance nickel is used. In another embodiment, when attaching the structure 251 to the substrate 401 includes welding the structure 251 to a stainless steel, the weld filler material includes a stainless steel.

Figure 7:
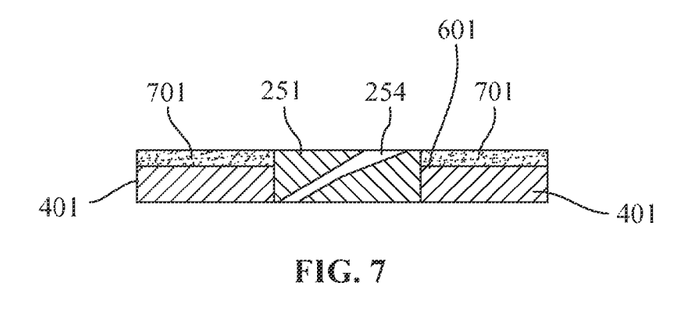
FIG. 7 is a cross section of a direct metal laser melting shaped and metered cooling hole secured to a coated article, according to an embodiment of the disclosure.
Figure 8:
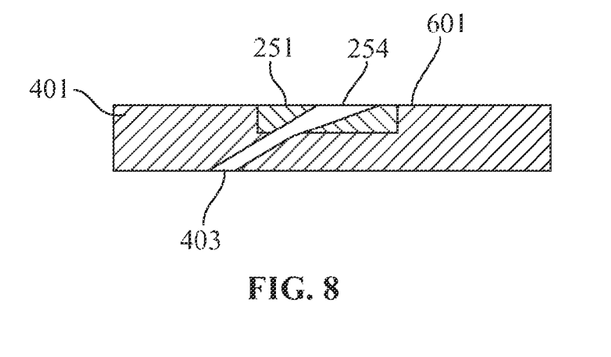
FIG. 8 is a cross section of a direct metal laser melting shaped cooling hole secured over a metered hole in an article, according to an embodiment of the disclosure.
Figure 9:
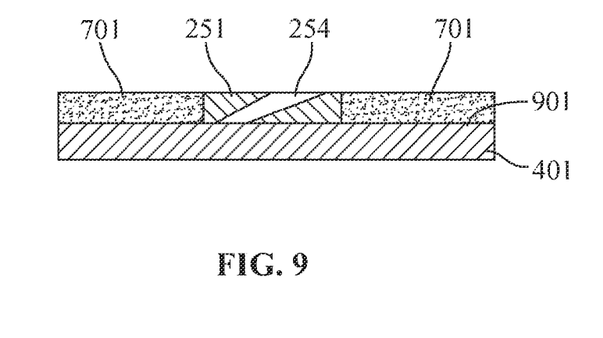
FIG. 9 is a cross section of a direct metal laser melting shaped cooling hole secured over a metered hole in a coated article, according to an embodiment of the disclosure.

Referring to FIGS. 6-9, the structure 251 is either attached to a modified surface 601 of the substrate 401 (FIGS. 6-8), or over an outer surface 901 of the substrate 401 (FIG. 9). The modified surface 601 includes a feature for accepting the structure 251, the feature corresponding to the predetermined thickness and the predetermined shape of the structure 251. When positioned in the feature, the structure 251 is recessed from, flush with, or extends past the outer surface 901. Suitable features include, but are not limited to, a channel, a recess, a slot, an opening, or any other modification for at least partially receiving the structure 251 therein.

Figure 6:
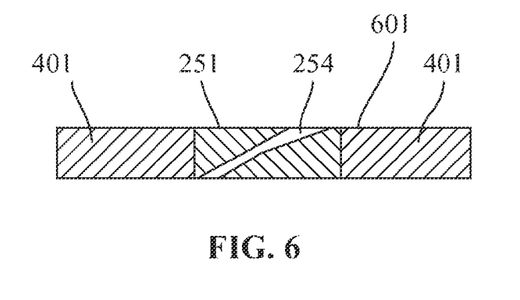
FIG. 6 is a cross section view of a direct metal laser melting shaped and metered cooling hole secured to an article, according to an embodiment of the disclosure.

In one embodiment, the modified surface 601 is formed during manufacture of the substrate 401. In another embodiment, the modified surface 601 is formed after manufacture of the substrate 401, such as, for example, through machining of the outer surface 901 to form the feature. In a further embodiment, when the article includes the existing article, the modified surface 601 is formed by removing existing apertures, machining the existing article to form the feature, and/or cleaning the existing article for direct attachment.

Each of the structures 251 includes any suitable number of the final apertures 254. Based upon the number of final apertures 254, more than one of the structures 251 may be attached to the substrate 401. For example, as shown in FIG. 4, two of the structures 251 are attached to the substrate 401, each of the structures 251 including one of the final apertures 254. In another example, as shown in FIG. 5, one of the structures 251 is attached to the substrate 401, the structure 251 including a plurality of the final apertures 254.

Each of the at least one final apertures 254 provides a passageway for fluid through the structure 251. When required, to extend the passageway through the substrate 401 and form the cooling hole, each of the at least one final apertures 254 is coupled to a corresponding metered hole 403. In one embodiment, both the at least one final aperture 254 and the metered hole 403 are formed in the structure 251, and extend entirely through the substrate 401 (FIGS. 6 and 7). In an alternate embodiment, the at least one final aperture 254 is positioned over the metered hole 403 formed in the substrate 401 (FIG. 8). In another alternate embodiment, the structure 251 is attached to the substrate 401 (FIG. 9), then the metered hole 403 is formed in the substrate 401. In yet another alternate embodiment, a portion of the metered hole 403 is formed in the structure 251, and the rest of the metered hole 403 is formed in the substrate 401 either before or after attaching the structure 251. When the metered hole 403 is formed in the substrate 401 after the structure 251 is attached, the metered hole 403 is formed through the at least one final aperture 254. Forming the metered hole 403 in the substrate 401 includes any suitable process, such as, but not limited to, drilling.

In one embodiment, the method 100 includes applying a coating 701, such as a bond coat and/or a thermal barrier coating (TBC), to the substrate 401. The bond coat includes any suitable bond coat, such as, but not limited to, a MCrAlY bond coat. The coating 701 is either applied before or after attaching the structure 251 to the substrate 401. For example, in another embodiment, the structure 251 is attached to the substrate 401, the at least one final aperture 254 is masked, and then the bond coating and/or the TBC is sprayed over the exposed base metal. Alternatively, the coating 701 is applied to the substrate 401, and then removed from an area to facilitate attachment of the structure 251.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for making shaped cooling holes in an article, comprising the steps of:
    providing a metal alloy powder;
    depositing the metal alloy powder forming an initial layer to a preselected thickness and having a preselected shape, the preselected shape including at least one aperture;
    providing a focused energy source;
    melting the metal alloy powder with the focused energy source, transforming the powder layer to a sheet of metal alloy;
    sequentially depositing an additional layer of the metal alloy powder forming a layer of a second preselected thickness and second preselected shape over the sheet of metal alloy, the second preselected shape including at least one aperture corresponding to the at least one aperture in the initial layer;
    melting the additional layer of the metal alloy powder with the focused energy source, increasing the sheet thickness and forming a structure having a predetermined thickness and shape and at least one aperture having a predetermined profile;
    providing a substrate; and
    attaching the structure having the predetermined thickness and shape and the at least one aperture having the predetermined profile to the substrate.

2. The method of claim 1, further comprising repeating the steps of sequentially depositing additional layers of metal alloy powder and melting the additional layers of metal alloy powder, each of the additional layers increasing the sheet thickness until the structure is obtained.

3. The method of claim 1, further comprising the additional steps of:
    masking the at least one aperture having the predetermined profile; and
    applying a coating over an exposed surface of the attached structure having the predetermined thickness.

4. The method of claim 1, comprising the additional step of forming metering holes in the substrate through the at least one aperture having the predetermined profile, the metering holes providing a passageway for fluid through the attached structure, the passageway including the at least one aperture having the predetermined profile.

5. The method of claim 1, wherein the structure having the predetermined thickness and shape is attached to the substrate by a process selected from the group consisting of welding, brazing, and diffusion bonding.

6. The method of claim 1, wherein the structure having the predetermined shape is attached over the outer surface of the substrate.

7. The method of claim 1, further comprising a step of modifying a substrate surface to provide a channel corresponding to and accepting the structure having the predetermined thickness and shape.

8. The method of claim 1, wherein the predetermined profile of the at least one aperture is an arcuate-shaped profile.

9. The method of claim 1, wherein the predetermined profile of the at least one aperture is a conically-shaped profile.

10. The method of claim 1, wherein the predetermined profile of the at least one aperture has an opening of at least 254 μm (0.010 inches).

11. The method of claim 1, wherein the predetermined profile of the at least one aperture forms an angle with a surface of the structure, the angle being selected from the group consisting of up to 90°, between 10° and 50°, and about 30°, wherein 90° is an aperture that is perpendicular to the surface of the structure.

12. The method of claim 1, wherein the initial layer and each additional layer of metal alloy powder is deposited to a thickness in the range of 20-100 μm (0.0008-0.004 inches).

13. The method of claim 1, wherein the structure is provided with a predetermined thickness in the range of 250-6350 μm (0.010-0.250 inches).

14. The method of claim 1, wherein the substrate comprises an alloy selected from the group consisting of gamma prime superalloys and stainless steels.

15. The method of claim 14, wherein the gamma prime superalloys are selected from the group of compositions consisting of, by weight, about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, about 0.05% carbon, about 0.004% boron, and a balance of nickel; about 7.5% cobalt, about 7.0% chromium, about 6.5% tantalum, about 6.2% aluminum, about 5.0% tungsten, about 3.0% rhenium, about 1.5% molybdenum, about 0.15% hafnium, about 0.05% carbon, about 0.004% boron, about 0.01% yttrium, and a balance of nickel; and between about 8.0% and about 8.7% Cr, between about 9% and about 10% Co, between about 5.25% and about 5.75% Al, up to about 0.9% Ti, between about 9.3% and about 9.7% W, up to about 0.6% Mo, between about 2.8% and about 3.3% Ta, between about 1.3% and about 1.7% Hf, up to about 0.1% C, up to about 0.02% Zr, up to about 0.02% B, up to about 0.2% Fe, up to about 0.12% Si, up to about 0.1% Mn, up to about 0.1% Cu, up to about 0.01% P, up to about 0.004% S, up to about 0.1% Nb, and a balance of nickel.

16. The method of claim 1, wherein the structure comprises an alloy selected from the group consisting of stainless steels, and superalloys.

17. The method of claim 16, wherein the superalloys are selected from the group of compositions consisting of, by weight, about 0.15-0.20% carbon, about 15.70-16.30% chromium, about 8.00-9.00% cobalt, about 1.50-2.00% molybdenum, about 2.40-2.80% tungsten, about 1.50-2.00% tantalum, about 0.60-1.10% columbium, about 3.20-3.70% titanium, about 3.20-3.70% aluminum, about 0.005-0.015% boron, about 0.05-0.15% zirconium, about 0.50% maximum iron, about 0.20% maximum manganese, about 0.30% maximum silicon, about 0.015% maximum sulfur, and a balance nickel; about 5% iron, between about 20% and about 23% chromium, up to about 0.5% silicon, between about 8% and about 10% molybdenum, between about 3.15% and about 4.15% Nb+Ta, up to about 0.5% manganese, up to about 0.1% carbon, and a balance nickel; about 50%-55% Nickel+Cobalt, about 17%-21% chromium, about 4.75%-5.50% columbium+tantalum, about 0.08% carbon, about 0.35% manganese, about 0.35% silicon, about 0.015% phosphorus, about 0.015% sulfur, about 1.0% cobalt, about 0.35%-0.80% aluminum, about 2.80%-3.30% molybdenum, about 0.65%-1.15% titanium, about 0.001%-0.006% boron, 0.15% copper, balance of iron; and about 20% chromium, about 10% cobalt, about 8.5% molybdenum, maximum of about 2.5% titanium, about 1.5% aluminum, maximum of about 1.5% iron, maximum of about 0.3% manganese, maximum of about 0.15% silicon, about 0.06% carbon, about 0.005% boron, and a balance nickel.

18. The method of claim 1, wherein the step of providing the focused energy source includes providing the focused energy source selected from the group consisting of a laser device and an electron beam device.

19. The method of claim 18, wherein the step of providing the laser device includes providing a laser device selected from the group consisting of a fiber laser, a $CO_2$ laser and a ND-YAG laser.

20. The method of claim 19, wherein the step of providing a laser includes providing a fiber laser operating in the power range of 125-500 watts at a travel speed of 400-1200 mm/sec.

21. The method of claim 14, further comprising, when the step of attaching is brazing, a braze material selected from the group consisting of a boron-nickel alloy and a silicon nickel alloy.

22. The method of claim 14, further comprising, when the step of attaching is welding a substrate of a gamma prime superalloy, a weld filler material comprising an alloy including a composition selected from the group consisting of, by weight, about 0.015% boron, about 0.05% to about 0.15% carbon, about 20% to about 24% chromium, about 3% iron, about 0.02% to about 0.12% lanthium, about 1.25% manganese, about 20% to about 24% nickel, about 0.2% to about 0.5% silicon, about 13% to about 15% tungsten, and a balance cobalt; and about 22% chromium, about 16% iron, about 9% molybdenum, about 1.5% cobalt, about 0.6% tungsten, about 0.10% carbon, about 1% manganese, about 1% silicon, about 0.008% boron and a balance nickel.

23. The method of claim 14, further comprising, when the step of attaching is welding a substrate of a stainless steel, a weld filler material comprising a stainless steel.

24. The method of claim 1, further comprising the additional steps of, after completing the step of repeating the steps of sequentially depositing:
    hot isostatically pressing the structure at an elevated temperature and elevated pressure sufficient to further consolidate the structure; and
    solutionizing the structure comprising consolidated metal alloy powder at an elevated temperature and for a time sufficient for distributing segregated alloying elements within the structure.

* * * * *